W. C. DOSS.
Seed-Planter.
No. 19,549.                                  Patented Mar. 9, 1858.
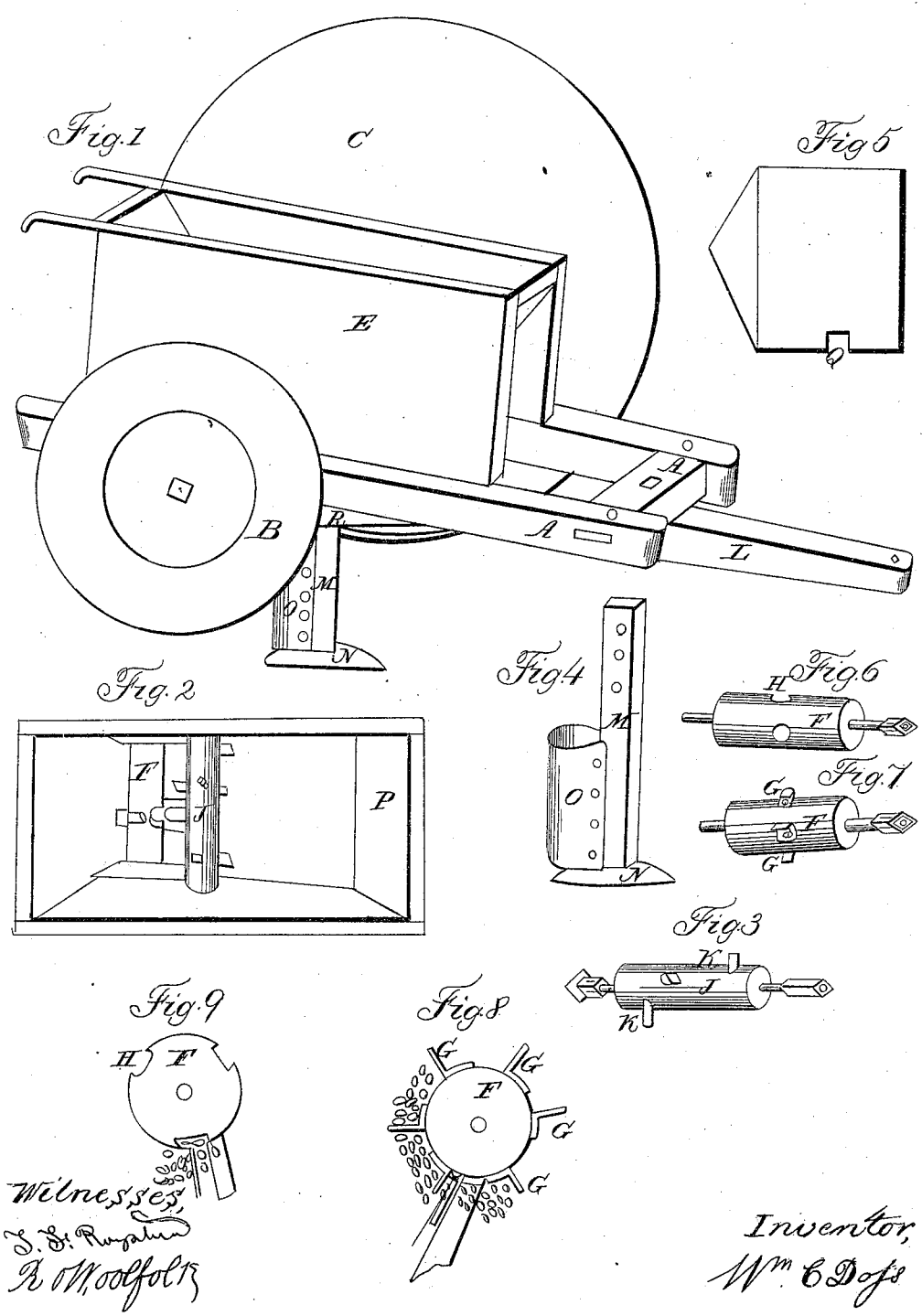

UNITED STATES PATENT OFFICE.

WM. C. DOSS, OF TEXANA, TEXAS.

IMPROVEMENT IN SEED-PLANTERS.

Specification forming part of Letters Patent No. 19,549, dated March 9, 1858.

*To all whom it may concern:*

Be it known that I, WILLIAM C. DOSS, of Texana, in the county of Jackson and State of Texas, have invented a new and improved mode of planting cotton-seed, corn, beans, peas, &c.; and I do hereby declare that the following is a full and exact description thereof, reference being had to the accompanying drawings, and to the letters of reference marked thereon—

Figure 1 being a side view, Fig. 2 being top view of hopper with the working parts of the cylinders F and J.

The nature of my invention consists of a cylinder made to revolve at the bottom of a hopper, the cylinder being provided with fingers about an inch in length, by which cotton-seed are deposited regularly through a tube at the bottom of the colter and behind it, and by means of cups in the cylinder corn, beans, peas, &c., are deposited with the same regularity and at any required depth.

To enable others skilled in the art to make and use my invention, I will proceed to describe its construction and operation.

I make a frame three feet long and ten inches wide of two by four inch scantling, (marked A in the accompanying cut,) and consisting of two side pieces and three cross-bars on one side of this frame. I have a wheel, B, about two feet in diameter, that works the cylinder F. On the other side I have another wheel, C, about three feet in diameter, that works the feeding-cylinder J. I have a hopper, E, eight inches wide, and two and a half feet long at the top, and eight inches by three at the bottom, covering one-third of the cylinder F, that is attached to the frame. The cylinder F is eight inches long and four inches in diameter, and it is attached to frame A about fourteen inches from the hind end, and the opening in the hopper is immediately over this cylinder, so that the seeds in the hopper rest on it. This cylinder has from six to nine fingers, G, situated at equal distances around the center or middle of the cylinder. Said fingers are used only in planting cotton-seed, the space between these fingers to be greater or smaller, according to the distance at which the seed are to be planted. These fingers are made of thin strips of iron about one and one-half inch long and five-eighths inch wide, crooked in the form of a right angle, one side of the angle seven-eighths inch long, the other side five-eighths inch, and through this last is a screw-hole, by which it is screwed to the cylinder, leaving the finger that takes the cotton-seed seven-eighths inch long. There are two openings, Q, in the bottom of the hopper next to the cylinder F, one and one-fourth inch deep and one inch wide, for the fingers to pass through. While the cylinder revolves through the hind opening the fingers pass into the hopper, and through the front opening the fingers and cotton-seed pass out. Fig. 7, F is cylinder ready for planting cotton-seed, side view; Fig. 8, F, end view. When needed for planting other seeds besides cotton these fingers are to be taken off, and the holes through which they are accustomed to pass must be stopped by screwing on strips over the holes at the lower edge of the hopper, inside. For planting corn and other seeds I have holes H made in the cylinder F seven-eighths inch in diameter and sufficiently deep to receive the seed their full length about one-fourth inch in the same circle described by the fingers. The side of the hole, both in front and in the rear, is gouged out underneath, so that the bottom of the hole is a little longer than the opening at the surface, which prevents the grains of corn, &c., from crushing and passing underneath the lower edge of the hopper by allowing them to give a little when grazed by the edge under which they pass. Fig. 6, F is cylinder stripped of fingers and ready for planting corn or any other seeds, a side view and form of the cups, &c.; Fig. 9, F, an end view, showing the form of a cup. The feeding-cylinder J is eight inches long, about three inches in diameter, and is situated inside of the hopper five or six inches above and a little in advance of cylinder F. It has from four to eight paddles, K, from one to two inches long, one and one-fourth inch wide, one-half inch thick at the base, and wedging toward the point. These paddles are set in the cylinder at right angles with it, scattered at equal distances from each other over its surface, but not placed so near its center or middle as to interfere with the fingers of the lower cylinder when in motion. These paddles are set spirally, those at the right hand of the center of the cylinder turning to the right at an angle of about sixty degrees with the right side of the hopper, those on the left side turning to the left at an angle of about sixty degrees with the left side of the hopper, so that in revolving they incline the seed to the center of the hopper, where they can be reached by the fingers. This cylinder is useful only in planting cotton-seed. The beam L is about five feet long, and three inches square at the hind end and two and one-half inches square at the fore end. A strip of iron one-eighth inch thick and three inches wide passes from one side to the other around the end of the beam, and is secured by bolts passing through the beam in front of the colter. At the bottom of the hind end of the beam is an iron plate, R, three and one-fourth inches wide, one-half inch thick, and eighteen inches long, secured by a bolt and band. It has a mortise in the hind end for the cotton to pass through, and there is a corresponding mortise through the end of the beam, close to the end. The beam is secured to the frame A by a bolt passing through it and the front cross-bar of the frame and another bolt through the second bar of the frame and the hind part of the beam in such a manner as to allow the cotton to occupy a position just in advance of the fingers of cylinder F. The colter M is made of a bar of iron about seventeen inches long, two inches wide, and one inch thick. This colter has a foot, N, of a triangular form. From the point to the heel on either side the distance is seven inches, and six inches across the heel behind. It is cupping underneath, and the seed is deposited at the heel of the colter. Attached to this colter behind is a tube, O, about nine inches long, made of sheet-iron, leaving an opening inside one and one-fourth by three inches, funneled a little at the top, which is situated so as to catch the seed as it leaves the hopper and conduct it to the bottom of the colter. The colter passes up through the hind end of the beam and the mortise in the plate R, and is secured by a bolt passing through the beam and the colter. There are other holes above and below in the colter, by which it may be made to run deep or shallow.

What I claim as my invention, and desire to secure by Letters Patent, is—

The cylinder F, provided with the cups H and fingers G, in combination with the cylinder J, armed with obliquely-set paddles K, arranged and operated in the manner and for the purpose specified.

WM. C. DOSS.

Witnesses:
    T. F. RUYSTER.
    R. O. WOOLFOLK.